US012226866B2

(12) United States Patent
Jaramillo et al.

(10) Patent No.: US 12,226,866 B2
(45) Date of Patent: Feb. 18, 2025

(54) PNEUMATIC DRILL SYSTEM AND FOREIGN OBJECT DEBRIS COLLECTION DRILL ATTACHMENT

(71) Applicant: Spirit AeroSystems, Inc, Wichita, KS (US)

(72) Inventors: Todd B. Jaramillo, Wichita, KS (US); Matthew R. Schroeder, Wichita, KS (US); Chelsea Sewell, Wichita, KS (US); Alexis Winkle, Wichita, KS (US); Adrian Schrage, Wichita, KS (US); John Adam Price, Wichita, KS (US); John Robert Dye, III, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 21 days.

(21) Appl. No.: 18/125,587

(22) Filed: Mar. 23, 2023

(65) Prior Publication Data
US 2024/0316711 A1    Sep. 26, 2024

(51) Int. Cl.
*B23Q 11/00* (2006.01)
(52) U.S. Cl.
CPC ...... *B23Q 11/0046* (2013.01); *B23Q 11/0071* (2013.01)
(58) Field of Classification Search
CPC ............ B23Q 11/0046; B23Q 11/0071; B23Q 11/006; B23Q 11/0067; B23Q 11/02
See application file for complete search history.

(56) References Cited

U.S. PATENT DOCUMENTS

| 2,041,689 | A | * | 5/1936 | Baumeister | ........... E21B 21/015 |
| | | | | | 173/60 |
| 3,776,647 | A | | 12/1973 | Hart | |
| 5,356,245 | A | * | 10/1994 | Hosoi | .................. B23Q 11/006 |
| | | | | | 408/67 |
| 5,779,402 | A | | 7/1998 | Kameda | |
| D695,584 | S | | 12/2013 | Chen | |
| 9,579,762 | B2 | | 2/2017 | Sullivan | |

(Continued)

OTHER PUBLICATIONS

European Search Report, Europe Patent Application No. 24165362.5, dated Sep. 12, 2024, 7 pages, European Patent Office, Munich, Germany.

*Primary Examiner* — Andrew M Tecco
*Assistant Examiner* — Nicholas E Igbokwe
(74) *Attorney, Agent, or Firm* — Stinson LLP

(57) ABSTRACT

A foreign object debris (FOD) collection drill attachment for attaching to a drill includes with a drill guide bushing holder, a chip breaker bushing, an air supply line, a chip evacuation line, a chip collection hopper, and an air manifold. The drill guide bushing holder includes an inlet channel receiving air from the air supply line, an outlet channel, and a holder center channel. The inlet channel and the outlet channel each open into the holder center channel through which an end protrusion of the chip breaker bushing extends to break up FOD on a drill bit of the drill. The cross-sectional area of the inlet channel is smaller than the cross-sectional area of the outlet channel, creating a Venturi effect between the inlet channel and the outlet channel to pull FOD away from the drill bit and through the chip evacuation line to the chip collection hopper.

19 Claims, 5 Drawing Sheets

(56) References Cited

U.S. PATENT DOCUMENTS

| | | | |
|---|---|---|---|
| 2007/0034064 A1* | 2/2007 | Nishikawa | B23D 59/006 83/100 |
| 2010/0316455 A1* | 12/2010 | Sanchez | B23Q 11/0046 408/58 |
| 2018/0236621 A1* | 8/2018 | Arthur | B23Q 11/0071 |
| 2019/0150684 A1* | 5/2019 | Marler | B24B 55/10 |

* cited by examiner

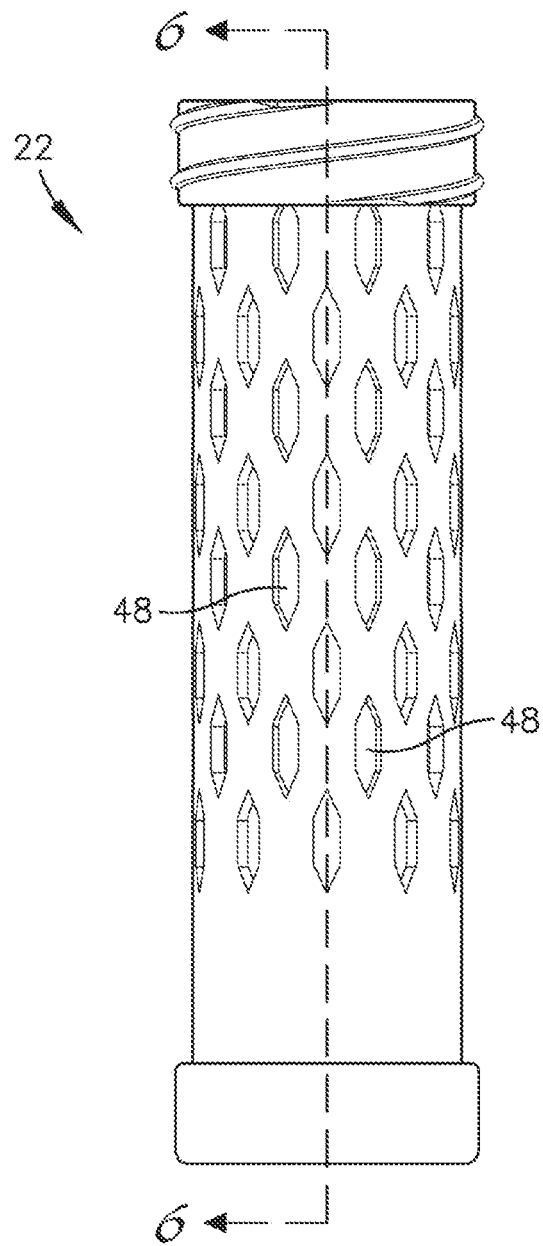
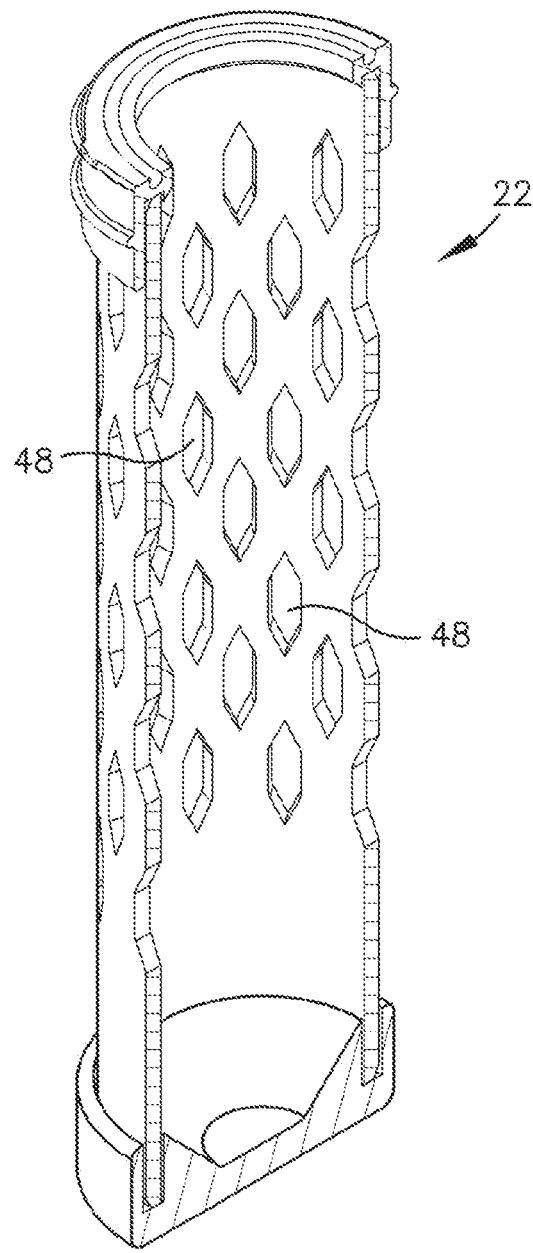
Fig. 5
Fig. 6

PNEUMATIC DRILL SYSTEM AND FOREIGN OBJECT DEBRIS COLLECTION DRILL ATTACHMENT

BACKGROUND

Drilling a hole into objects with a drill and a drill bit causes portions of a material being drilled to be forced out of the hole being formed. Specifically, foreign object debris (FOD) often forms in long spiral-shaped pieces and are forced outward by the drill bit. Because of the spinning of the drill bit and the FOD's long spiral-shaped pieces, some of this FOD forms around a portion of the drill bit outward of the hole being formed and can get in the way of the drill as the drilling process continues. Furthermore, FOD in this spiral form and/or as chunks, chips, or dust can make a drilled work surface and the space therearound it messy. Furthermore, sweeping FOD from the floor can introduce additional elements to the FOD collected that would make aluminum and titanium chips, for example, unsuitable for recycling. Another problem with using such drills is that chips from the FOD can fly outward from the hole being formed and hit a surface of the material being drilled, causing nicks or other imperfections on that surface.

Thus, there is a need for improved drilling system that does not suffer from these and other disadvantages of the prior art.

SUMMARY

In some embodiments of the invention, a foreign object debris (FOD) collection drill attachment includes a drill guide bushing holder, a chip breaker bushing, an air supply line, a chip evacuation line, and a chip collection hopper. The drill guide bushing holder includes an inlet channel, an outlet channel, and a holder center channel. The inlet channel has a first cross-sectional area, the outlet channel has a second cross-sectional area, and the first cross-sectional area is smaller than the second cross-sectional area. The holder center channel has a first opening, a second opening, a first region, and a second region. The first region extends from the first opening to the second region and the second region extends from the first region to the second opening. The inlet channel and the outlet channel each open into the second region of the holder center channel.

The chip breaker bushing is positioned within the holder center channel of the drill guide bushing holder, and the chip breaker bushing has a cylindrical wall having a first circumference about a center axis of the chip breaker bushing. The cylindrical wall forms a bushing center channel extending along a length of the center axis of the chip breaker bushing. The bushing center channel has sufficient cross-sectional area such that a drill bit of a drill fits therethrough and is rotatable therein. The air supply line has a first end fluidly coupled with the inlet channel and a second end fluidly couplable to a pneumatic pressure source for operation of the drill, such that pneumatic pressure for actuating the drill bit is also passed into the inlet channel via the air supply line. The chip evacuation line is fluidly coupled with the outlet channel, and a Venturi effect between the inlet channel and the outlet channel pulls FOD away from the drill bit in the second region of the holder center channel and through the chip evacuation line. The chip collection hopper is fluidly coupled with the chip evacuation line and collects the FOD therein.

The FOD collection drill attachment can also include an air manifold with an inlet fluidly couplable to the pneumatic pressure source and a first outlet configured to be fluidly coupled with the drill for actuating the drill bit, as well as a second outlet fluidly coupled with the air supply line. This allows the same pneumatic pressure source to actuate the drill bit and simultaneously force FOD out of the drill guide bushing holder outlet. Furthermore, the air manifold can attach to the chip collection hopper.

This summary is intended to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in more detail below with reference to the attached drawing figures, wherein:

FIG. 5 is a side view of a chip collection hopper of the FOD collection drill attachment of FIG. 1, in accordance with embodiments of the present invention;

FIG. 6 is a cross-sectional view of the chip collection hopper of FIG. 5 along line 6-6, in accordance with embodiments of the present invention;

Figure 1:
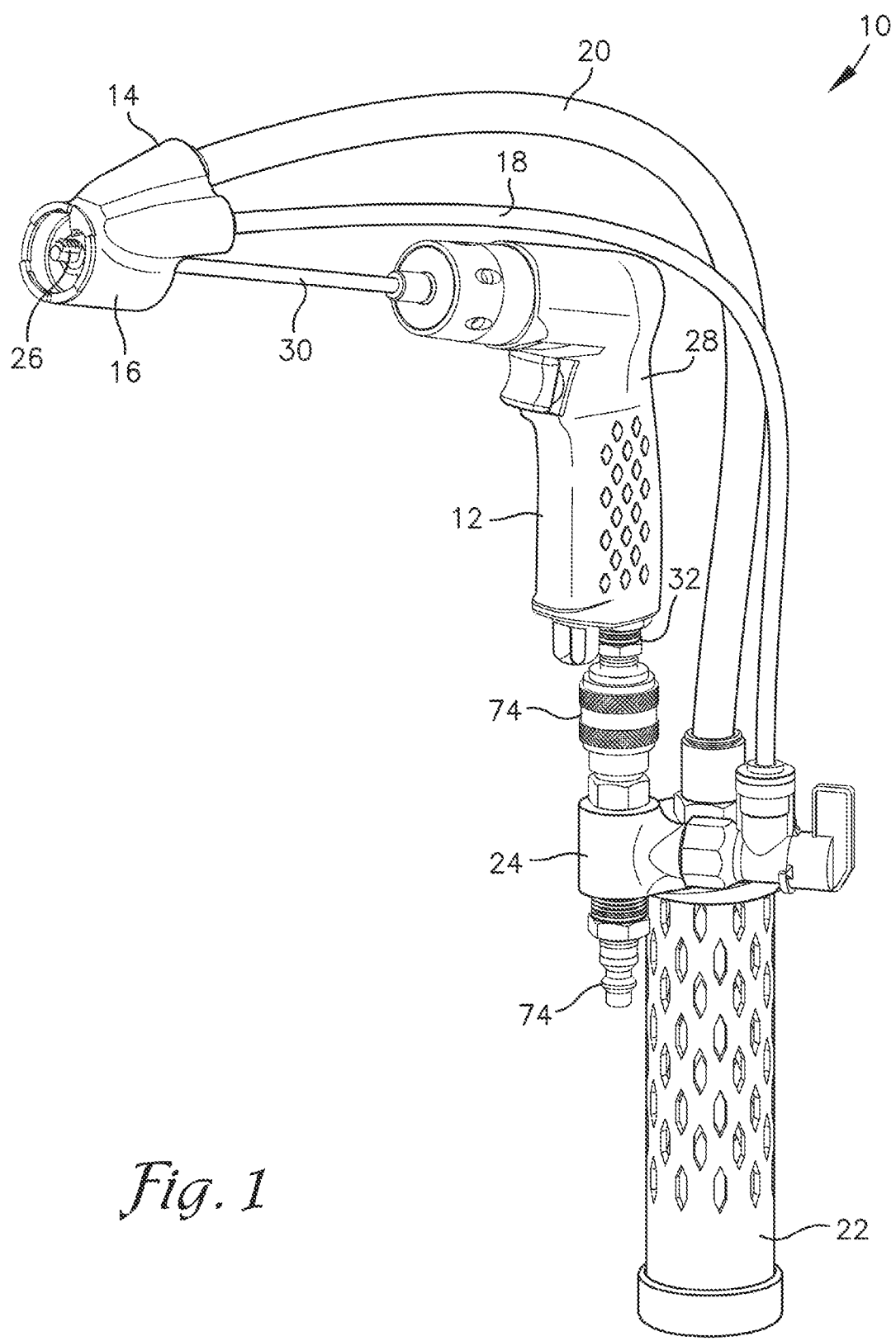
FIG. 1 is a side elevation view of a pneumatic drill system including a pneumatic drill and a foreign object debris (FOD) collection drill attachment, in accordance with embodiments of the present invention.
Figure 7:
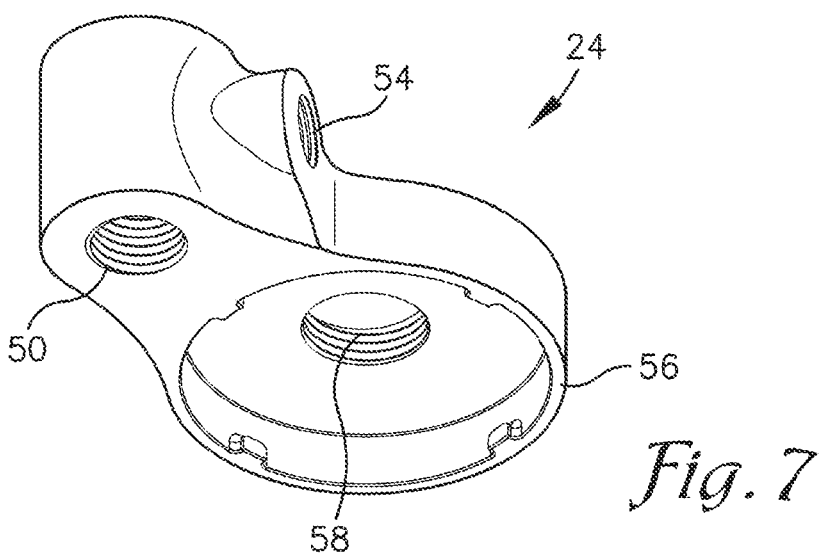
Figure 8:
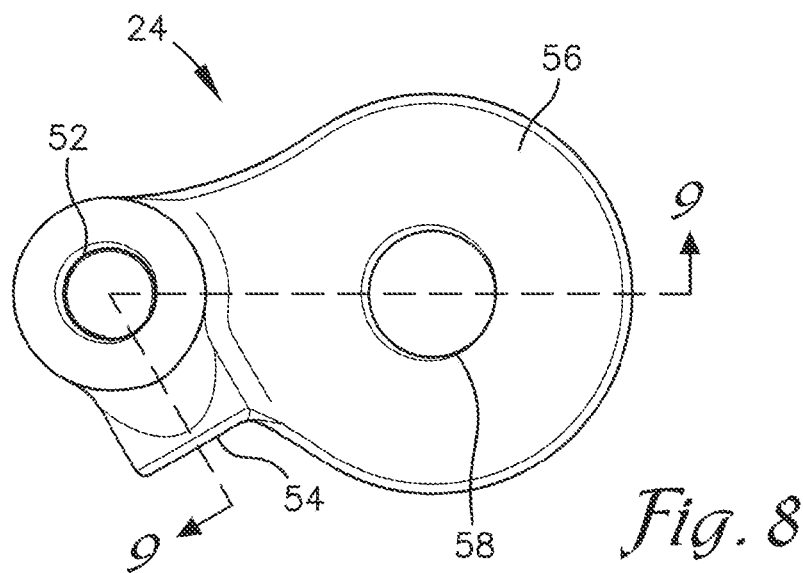
Figure 9:
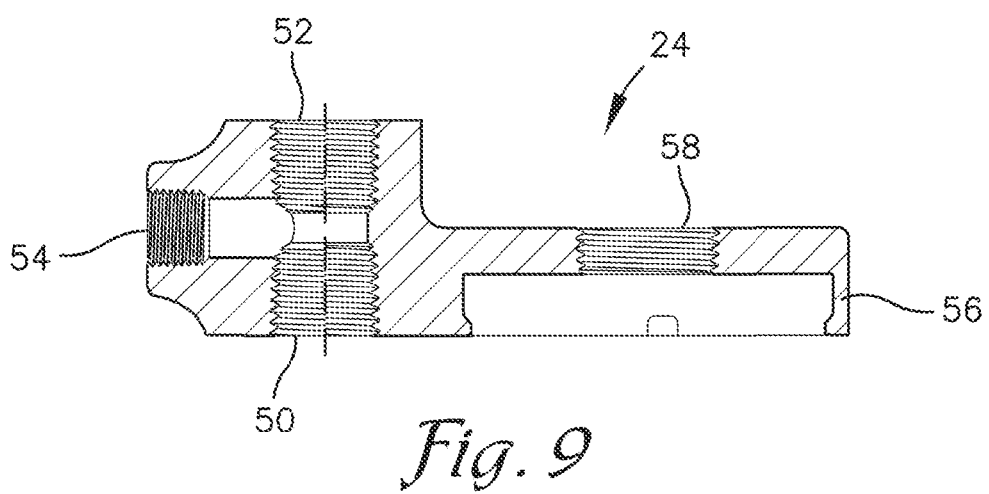
Figure 10:
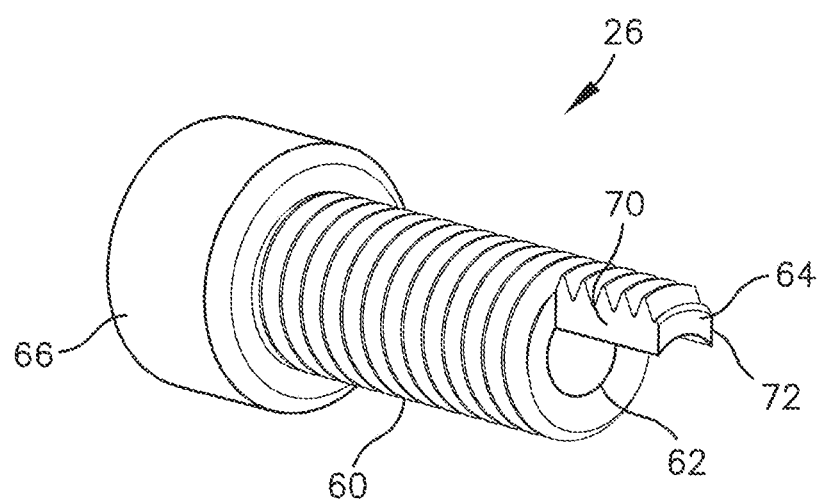

FIG. 7 a side perspective view of an air manifold of the FOD collection drill attachment of FIG. 1, in accordance with embodiments of the present invention;

FIG. 8 is a top view of the air manifold of FIG. 1, in accordance with embodiments of the present invention;

FIG. 9 is a cross-sectional side view of the air manifold taken along line 9-9 in FIG. 8, in accordance with embodiments of the present invention; and FIG. 10 is a perspective end view of a drill guide bushing holder of the FOD collection drill attachment of FIG. 1, in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

FIG. 1 depicts a pneumatic drill system 10 with a pneumatic drill 12 and a foreign object debris (FOD) collection drill attachment 14. The FOD collection drill attachment 14 includes: a drill guide bushing holder 16, an air supply line 18, a chip evacuation line 20, a chip collection hopper 22, an air manifold 24, and/or a chip breaker bushing 26.

The pneumatic drill 12 includes a drill body 28 and a drill bit 30, as known in the art of pneumatic drills for drilling holes into various materials or work surfaces. The drill body 28 contains or otherwise has attached thereto mechanical actuation components driven by compressed air. The drill bit 30 is a cutting tool used in a drill to remove material to create holes, and generally has a circular cross-section. The drill bit 30 may have a size and/or shape known in the art and configured to create particular types of holes in a particular material or workpiece to be drilled. The drill bit 30 is powered by the drill body 28 and/or various actuating components therein or attached thereto. The drill body 28 grasps an upper end of the drill bit 30 referred to as the shank in a chuck or the like. Because the drill bit 30 is pneumatically actuated via gas or air pressure, the drill body 28 can have a pneumatic inlet 32 for attachment to a pneumatic pressure source (not shown) for operation of the pneumatic drill, providing pneumatic pressure for actuating the drill bit 30 to rotate for drilling. In some embodiments, the pneumatic drill 12 must be sized and configured to be operated single handedly, with the assumption that one hand is operating the pneumatic drill 12, and one hand is holding the drill guide bushing holder 16.

Figure 2:
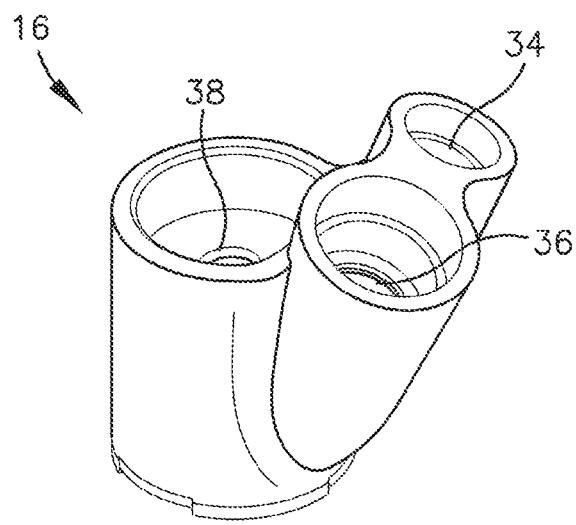
FIG. 2 is a side perspective view of a drill guide bushing holder of the FOD collection drill attachment of FIG. 1, in accordance with embodiments of the present invention.
Figure 3:
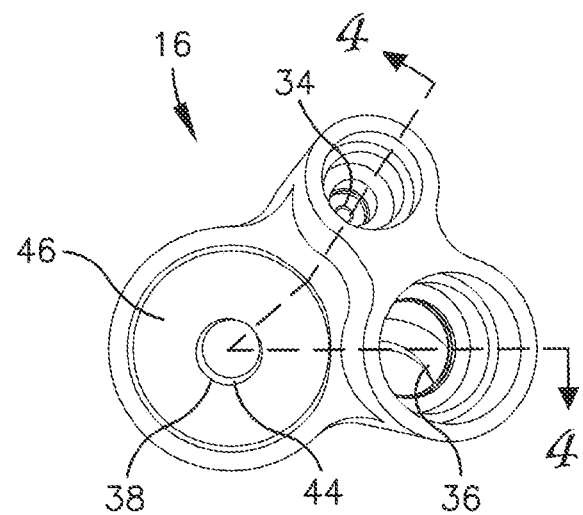
FIG. 3 is a side perspective view of the drill guide bushing holder of FIG. 2, in accordance with embodiments of the present invention.
Figure 4:
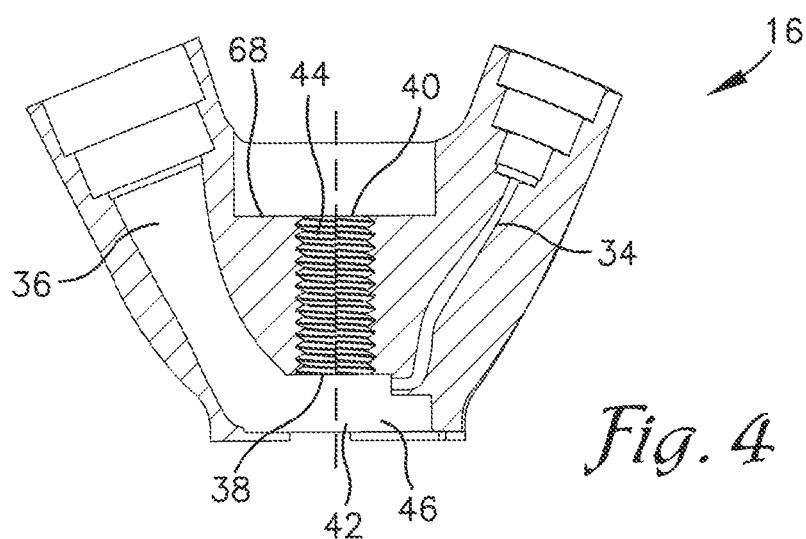
FIG. 4 is a cross-sectional side view of the air manifold of FIG. 2 along line 4-4, in accordance with embodiments of the present invention.

As depicted in FIGS. 2-4, the drill guide bushing holder 16 includes an inlet channel 34, an outlet channel 36, and a holder center channel 38. The inlet channel 34 has a first cross-sectional area and the outlet channel 36 has a second cross-sectional area. In some embodiments, the first cross-sectional area is smaller than the second cross-sectional area. The holder center channel 38, in some embodiments, has a first opening 40, a second opening 42, a first region 44, and a second region 46. The first region 44 can extend from the first opening 40 to the second region 46 and the second region 46 can extend from the first region 44 to the second opening 42. The second region 46 generally has a cross-sectional area that is greater than a cross-sectional area of the first region 44. However, in other embodiments the cross-sectional area of the first and second regions 44, 46 can be approximately identical without departing from the scope of the technology described herein. The inlet channel 34 and the outlet channel 36 each open into the holder center channel 38. For example, the inlet channel 34 and the outlet channel 36 can each open into the second region 46 of the holder center channel 38. The drill guide bushing holder 16, at a location of the second opening 42, can be configured to abut the workpiece to be drilled during the drilling thereof.

The drill guide bushing holder 16 creates a Venturi effect that pulls chips away from a top surface of a workpiece, also referred to as a skin of the workpiece being drilled by the drill bit 20. Because of the Venturi effect caused by the incoming air and the chip breaker effects described below, chips of FOD are evacuated quickly and cleanly away from the skin, reducing FOD significantly and reducing chances for chips to cause skin or scratches on the workpiece being drilled.

The air supply line 18 and the chip evacuation line 20, as both depicted in FIG. 1, can each be a hose, pipe, tubing, or the like and can fluidly couple to the inlet channel 34 and the outlet channel 36, respectively. The air supply line 18 can have, for example, a first end fluidly coupled with the inlet channel 34 of the drill guide bushing holder 16 and a second end fluidly couplable to a pneumatic pressure source for operation of the pneumatic drill 12, such that pneumatic pressure for actuating the drill bit 30 is also passed into the inlet channel 34 via the air supply line 16. For example, the air supply line 16 can be coupled to the air manifold 24 later described herein, which can likewise be fluidly coupled to the pneumatic inlet 32 of the drill body 28 and a pneumatic pressure source. In one example embodiment, the air supply line 18 is a polypropylene tubing with an on/off switch fitting added to stop the airflow. However, other materials can be used without departing from the scope of the technology herein. The air supply line's length can be between one inch to five feet, depending on drill and mechanic's preference with no effect to functionality. Other lengths can be used without departing from the scope of the technology herein.

The chip evacuation line 20 is fluidly coupled with the outlet channel 36 at one end and fluidly coupled with the chip collection hopper 22 at another end. During pneumatic operation of the pneumatic drill 12, a Venturi effect between the inlet channel 34 and the outlet channel 36 of the drill guide bushing holder 16 is configured to pull FOD (or chips of FOD) away from the drill bit 30 in the second region 46 of the holder center channel 38 and through the chip evacuation line 20. In one example embodiment, the chip evacuation line 20 is polypropylene. The chip evacuation line's size and flexibility can be selected based on FOD size and ergonomic requirements. For example, the chip evacuation line 20 can be sized large enough to allow FOD and/or FOD chips to travel a full length of the chip evacuation line 20. The length, in some embodiments, can be between one inch to five feet, depending on drill needs and a mechanic's preference with no effect to functionality. However other lengths can be used without departing from the scope of the technology herein.

As depicted in FIGS. 5-6, the chip collection hopper 22 is a collection area for drilled FOD material. The chip collection hopper 22 fluidly coupled with the chip evacuation line 20 is configured for collecting the FOD therein. The chip collection hopper 22 is a fluid container sized and shaped to remain out of the way of handle, trigger, and/or drill bit regions of the pneumatic drill. In some embodiments, the chip collection hopper 22 is hollow and cylindrical or substantially cylindrical, with a first end enclosed and a second end having at least one opening through which FOD or FOD chips enter from the chip evacuation line 20. The chip collection hopper 22 has one or more walls (e.g., the cylindrical wall and first end enclosed). The one or more walls, in some embodiments, have a plurality of ventilation openings 48 or perforations formed therethrough, such that the chips of FOD are maintained therein while still allowing for a flow of air. Additionally or alternatively, the chip collection hopper 22 is lined with metal fabric lining (not shown), such that the chips of FOD are maintained therein while still allowing for a flow of air.

In some embodiments the chip collection hopper 22 is fixedly or removably attached to the air manifold 24, such that the chip collection hopper 22 is attachable to the drill body 28 of the pneumatic drill 12 via the air manifold 24, as later described herein. For example, screw threads around a top opening of the chip collection hopper 22 can allow for removing of the chip collection hopper 22 as later described herein, via a standard screwing motion. Furthermore, an O-ring or other such seal can be located between the chip collection hopper 22 and the air manifold 24 in some embodiments. The size of the chip collection hopper 22 can vary to allow more or less FOD collection before the chip collection hopper 22 must be emptied. The size of the chip collection hopper 22 can vary depending upon the pneumatic drill being used, weight considerations, and the like. In one example embodiment, the chip collection hopper 22 is scaled to fit FOD chips from approximately 300 holes of 0.29" stack with a 0.187" drill bit. However, other sizes, shapes, and capacities can be used for the chip collection hopper without departing from the scope of the technology described herein. As FOD chips are added into the chip collection hopper 22 and thus weight increases, the pneumatic drill system 10 may become too heavy and create ergonomic issues for mechanics or users. Thus, size of the chip collection hopper 22 can be limited based upon a number of factors and ergonomic considerations such as expected weight when full.

As depicted in FIGS. 7-9, the air manifold 24 has an inlet 50 fluidly couplable to the pneumatic pressure source, a first outlet 52 configured to be fluidly coupled with the pneumatic drill's pneumatic inlet 32 for actuating the drill bit 30, and a second outlet 54 fluidly coupled with the air supply line 18. The air manifold 24 allows for the pneumatic pressure source to provide pneumatic force for operating the pneumatic drill 12 and also simultaneously creating the Venturi effect in the drill guide bushing holder 16 to suction FOD or FOD chips through the chip evacuation line 20 and into the chip collection hopper 22. The air manifold 24 can be fixedly or removably attached to the chip collection hopper 22, such that the chip collection hopper 22 is attachable or attached to the drill body 28 of the pneumatic drill 12 via the air manifold 24.

As noted above, the air manifold 24 is fixedly or removably attached to the chip collection hopper 22, such that the chip collection hopper 22 is attachable to the drill body 28 of the pneumatic drill 12 via the air manifold 24. Specifically, the air manifold 24 can include a cylindrical hopper holder 56 extending substantially laterally from portions of the air manifold 24 forming the inlet 50, first outlet 52, and second outlet 54. For example, the air manifold 24 can include the cylindrical hopper holder 56 with a primarily enclosed top forming a lid configured for attachment to the chip collection hopper 22 at its top opening. This lid can include an inlet opening 58 attachable to the pneumatic inlet 32 via quick connects and/or screw threads, for example. Attaching this cylindrical hopper holder 56/lid allows the chip collection hopper 22, the air supply line 18, and the chip evacuation line 20 to be all incorporated via a single unit, helping with drag on a user's hand while using the pneumatic drill with the FOD collection drill attachment attached thereto.

In some embodiments, screw threads can be formed around the chip collection hopper 22 and proximate to an opening of the chip collection hopper 22 and the air manifold's cylindrical hopper holder 56 can include matching screw threads within an inside surface of the cylindrical hopper holder 56, such that the chip collection hopper 22 can be removably attached to the air manifold 24. In other alternative embodiments, the cylindrical hopper holder 56 can otherwise be attached or attachable to the drill body 28 without departing from the scope of the technology described herein. In yet another alternative embodiment, the chip collection hopper 22 can be spaced a distance away from the drill body 28 and/or the air manifold 24 and only be attached thereto via the chip evacuation line 20.

As depicted in FIG. 1, in some embodiments, the chip breaker bushing 26 is positioned within the holder center channel 38 of the drill guide bushing holder 16. As depicted in FIG. 10, the chip breaker bushing 26 can comprise a cylindrical wall 60 having a first circumference about a center axis of the chip breaker bushing 26. The cylindrical wall 60, for example, forms a bushing center channel 62 extending along a length of the center axis of the chip breaker bushing 26. Furthermore, in some embodiments, the bushing center channel 62 has sufficient cross-sectional area such that the drill bit 30 of the pneumatic drill 12 fits therethrough and is rotatable therein, as depicted in FIG. 1. The cylindrical wall 60 of the chip breaker bushing 26 can, in some embodiments, comprise an end protrusion 64 positioned within the second region 46 of the holder center channel 38 such that FOD from a workpiece being drilled by the drill bit 30 is broken into smaller chips by striking the end protrusion 64 while the drill bit 30 rotates within the bushing center channel 62. That is, the chip breaker bushing 26 is sized and configured for breaking apart FOD into smaller chips before that FOD travels down the chip evacuation line 20. Without this breaking up of the FOD, the FOD becomes long curls, sometimes up to several inches long, and would disadvantageously clog the drill guide bushing holder 16. Furthermore, without this breaking up of the FOD, the drill guide (or the drill guide bushing holder 16) would need to be significantly larger and can become unwieldy.

The chip breaker bushing 26 can be, in some embodiments, longer than a standard bushing, with three quarters of the extra length of the bushing circumferentially removed, allowing a remaining part (e.g., the end protrusion 64) to cleave the FOD into smaller chips or smaller pieces of FOD. Specifically, as depicted in FIG. 10, the chip breaker bushing 26 fully seated within the holder center channel 38 described above is approximately 0.0625 inches above the skin or workpiece being drilled, optimizing a size of the FOD before it is broken up by the end protrusion 64 and removed to the chip collection hopper 22. This distance between the end protrusion 64 and the skin or workpiece is controlled by a length of the first region 44 and a length of the second region 46 of the holder center channel 38 of the drill guide bushing holder 16, and where an end ledge or head portion 66 of the chip breaker bushing 26 abuts a ledge 68 (as in FIG. 4) or top surface of the holder center channel 38.

In one example embodiment, as depicted in FIG. 10, the end protrusion 64 is an extended portion of the cylindrical wall 60 circumferentially traversing only a portion of the first circumference between two opposing side edges 70, 72. This can be accomplished, for example, but cutting away all but 25% of the cylindrical wall 60 a fraction of the way up an axial length of the cylindrical wall 60. In some embodiments, the extended portion of the cylindrical wall 60 circumferentially traverses a distance between the opposing side edges 70, 72 spanning anywhere from ten degrees to 180 degrees of the first circumference. In other embodiments, the extended portion of the cylindrical wall 60 circumferentially traverses a distance between the opposing side edges 70, 72 spanning anywhere from 45 degrees to 135 degrees of the first circumference. For example, the extended portion of the cylindrical wall 60 can circumferentially traverse a distance between the opposing side edge edges 70, 72 spanning approximately 90-degrees of the first circumference (i.e., about one quarter of the first circumference). In alternative embodiments, the end protrusion 64 is any protrusion extending therefrom in a direction away from the drill body 28 of the pneumatic drill 12, with the end protrusion 64 having a non-circumferential cross-section.

Advantageously, the end protrusion's location adjacent the spinning drill bit 30 allows the FOD (formed via debris from the workpiece being drilled) to be broken up thereby, as the drill bit 30 spins the FOD and thereby causes it to, for example, strike at least a leading one of the two opposing side edges 70, 72 of the end protrusion 64. Conversely, prior art drilling typically includes the FOD forming into long spiral pieces which can undesirably get caught around the spinning drill bit. Thus, the end protrusion 64 breaks up the FOD into chips that are less likely to get caught around the drill bit 30 and less likely to clog up the chip evacuation line 20 than in prior art drill systems. Furthermore, the location of the end protrusion 64 in the second region 46 of the holder center channel 38 where the Venturi effect is taking place allows for the broken-up chips of FOD to be sucked through the outlet channel 36, then the chip evacuation line 20, to the chip collection hopper 22.

Attachment of the FOD collection drill attachment 14 to the pneumatic drill 12 or other such pneumatically-actuated drills known in the art can be accomplished in a number of ways. For example, as noted above, the chip breaker bushing 26 within the drill guide bushing holder 16 can be slid onto the drill bit 30 and can be located approximately at a tip of the drill bit 30 or between the tip of the drill bit and the shank. The drill bit 30 can then rotate within and slide forward and aftward within the chip breaker bushing 26 during use, with a user holding the drill guide bushing holder 16 in place against the workpiece or with the drill guide bushing holder 16 otherwise maintained against the workpiece during use of the pneumatic drill 12. In some embodiments, the drill guide bushing holder 16 can have interior screw threads within the inlet channel 34, the outlet channel 36, and/or the first region 44 of the holder center channel 38. Likewise, exterior screw threads configured for attachment to the interior screw threads of the drill guide bushing holder 16 can be included on the chip breaker bushing 26, the air supply line 18, and/or the chip evacuation line 20. However, the interior and exterior screw threads can be reversed without departing from the scope of the technology herein in some instances. For example, air supply line 18 can have interior screw threads and the inlet channel 34 can have exterior screw threads on an outer surface of the drill guide bushing holder 16 for attachment therebetween. Alternatively, the inlet channel 34 and the outlet channel 36 can be fluidly coupled with the air supply line 18 and the chip evacuation line 20 using quick connects and other techniques known in the art for fluidly coupling two passageways together.

Furthermore, as noted above, the air manifold 24 can include one or more screw threads just inward or just outward of the inlets and outlets thereof, for attaching the air manifold 24 to mating screw threads on the pneumatic inlet 32 of the drill body 28, the chip collection hopper 22, and/or the air supply line 18. In some embodiments, the air manifold 24 can likewise cooperatively couple, via screw threads or the like, the chip collection hopper 22 physically to the drill body 28 and/or both fluidly and physically to the chip evacuation line 20. However, although attachments are depicted as being accomplished via screw threads among the parts described above, note that other components and techniques for physically and/or fluidly coupling two or more of the components can be used without departing from the scope of the technology described herein.

For example, some embodiments the pneumatic drill system 10 can include one or more quick connects 74 (as depicted in FIG. 1) for coupling various ones of the components described herein. For example, incoming air (via the pneumatic air source) can connect to a female quick connect matching the standard air lines used in the shop. A male quick connect can match the quick connect on the pneumatic drill 12 or other standard drills. For example, quick connects can be used between the pneumatic pressure source and the air manifold 24 and/or between the air manifold 24 and the pneumatic inlet 32 of the pneumatic drill 12, as depicted in FIG. 1. Additionally or alternatively, the quick connects can be used at either of the ends of the air supply line 18 and/or the chip evacuation line 20 without departing from the scope of the technology described herein. However, quick connects can also be omitted without departing from the scope of the technology described herein.

Advantageously, the addition of the chip breaker bushing 26 in the pneumatic drill system 10 makes the FOD chips smaller and allows a much smaller pneumatic drill system than prior art solutions. This reduces ergonomic concerns and allows closer drilling to other elements, such as tight spaces inside an aircraft or next to wedgeloks holding parts together. Also, using the Venturi effect and specialized air manifold 24 described herein eliminates the need for an extra air or vacuum line. This means that no additional floor space is needed for vacuums and vacuum hosing and no extra drag is applied on the mechanics' or users' hands due to additional lines attached to the pneumatic drill. Furthermore, because the FOD can be collected at its source, this FOD is advantageously eligible for recycling, unlike such FOD swept from the floor and thus containing other contaminants.

Although the invention has been described with reference to example embodiments illustrated in the attached drawing figures, it is noted that equivalents may be employed and substitutions made herein without departing from the scope of the invention as described and claimed herein. Sizes of various, lines, inlets, and outlets described herein are determined based on requirements of the particular pneumatic drill. Other various components described herein can include standard, over the counter, type parts for the pneumatic drill 12. However, various rigid components described herein may be made of aluminum or other light-weight materials in order to meet ergonomic weight requirements.

Having thus described one or more embodiments of the invention, what is claimed as new and desired to be protected by Letters Patent includes the following:

The invention claimed is:

1. A foreign object debris (FOD) collection drill attachment comprising:
 a drill guide bushing holder comprising:
   an inlet channel having a first cross-sectional area,
   an outlet channel, having a second cross-sectional area,
     wherein the first cross-sectional area is smaller than the second cross-sectional area, and a holder center channel having a first opening, a second opening, a first region, and a second region, wherein the first region extends from the first opening to the second region and the second region extends from the first region to the second opening, wherein the inlet channel and the outlet channel each open into the second region of the holder center channel;

an air supply line having a first end fluidly coupled with the inlet channel and a second end fluidly couplable to a pneumatic pressure source for operation of the drill, such that pneumatic pressure for actuating the drill bit is also passed into the inlet channel via the air supply line; and a chip evacuation line fluidly coupled with the outlet channel, wherein the drill guide bushing holder is shaped and arranged to generate a Venturi effect in the second region of the holder center channel between the inlet channel and the outlet channel when air from the pneumatic pressure source is imparted through the air supply line and wherein the Venturi effect in the second region of the holder center channel between the inlet channel and the outlet channel is configured to pull FOD away from the drill bit in the second region of the holder center channel and through the chip evacuation line without a vacuum line connecting the second region of the holder center channel to a source of vacuum pressure external to the second region of the holder center channel.

2. The FOD collection drill attachment of claim 1, further comprising: a chip breaker bushing positioned within the holder center channel of the drill guide bushing holder, the chip breaker bushing having a bushing center channel with sufficient cross-sectional area such that a drill bit of a drill fits therethrough and is rotatable therein, wherein the chip breaker bushing further comprises an end protrusion extending within the second region of the holder center channel, such that FOD from a workpiece being drilled by the drill bit is broken into smaller chips by striking the end protrusion while the drill bit rotates within the bushing center channel.

3. The FOD collection drill attachment of claim 2, wherein the chip breaker bushing comprises a cylindrical wall around the bushing center channel, having a first circumference, wherein the end protrusion is an extended portion of the cylindrical wall circumferentially traversing only a portion of the first circumference between two opposing side edges.

4. The FOD collection drill attachment of claim 3, wherein the extended portion of the cylindrical wall circumferentially traverses a distance between the opposing side edges spanning anywhere from ten degrees to 180 degrees of the first circumference.

5. The FOD collection drill attachment of claim 3, wherein the extended portion of the cylindrical wall circumferentially traverses a distance between the opposing side edges spanning anywhere from 45 degrees to 135 degrees of the first circumference.

6. The FOD collection drill attachment of claim 1, further comprising an air manifold with an inlet fluidly coupled to the pneumatic pressure source, a first outlet configured to be fluidly coupled with the drill for actuating the drill bit, and a second outlet fluidly coupled with the air supply line.

7. The FOD collection drill attachment of claim 6, further comprising a chip collection hopper fluidly coupled with the chip evacuation line and configured for collecting the FOD therein, wherein the air manifold is fixedly or removably attached to the chip collection hopper, such that the hopper is attachable to a body of the drill via the air manifold.

8. The FOD collection drill attachment of claim 1, wherein the drill guide bushing holder comprises interior screw threads within at least one of the inlet channel, the outlet channel, and the first region of the holder center channel.

9. The FOD collection drill attachment of claim 8, wherein at least one of the following comprises exterior screw threads configured for attachment to the interior screw threads of the drill guide bushing holder: the air supply line and the chip evacuation line.

10. The FOD collection drill attachment of claim 1, further comprising a chip collection hopper fluidly coupled with the chip evacuation line and configured for collecting the FOD therein, wherein the chip collection hopper has one or more walls having a plurality of ventilation openings or perforations formed therethrough.

11. A pneumatic drill system comprising:
a pneumatically-driven drill having a drill body and a drill bit; and
a foreign object debris (FOD) collection drill attachment comprising: a
drill guide bushing holder including:
an inlet channel having a first cross-sectional area,
an outlet channel, having a second cross-sectional area, wherein the first cross-sectional area is smaller than the second cross-sectional area, and
a holder center channel having a first opening, a second opening, a first region, and a second region, wherein the first region extends from the first opening to the second region and the second region extends from the first region to the second opening, wherein the inlet channel and the outlet channel each open into the second region of the holder center channel,
a chip breaker bushing positioned within the holder center channel of the drill guide bushing holder, the chip breaker bushing comprising a cylindrical wall having a first circumference about a center axis of the chip breaker bushing, wherein the cylindrical wall forms a bushing center channel extending along a length of the center axis of the chip breaker bushing, wherein the drill bit extends through and is rotatable within the bushing center channel, wherein the cylindrical wall comprises an end protrusion positioned within the second region of the holder center channel such that FOD from a workpiece being drilled by the drill bit is broken into smaller chips by striking the end protrusion while the drill bit rotates within the bushing center channel,
an air supply line having a first end fluidly coupled with the inlet channel and a second end fluidly couplable to a pneumatic pressure source for operation of the drill, such that air for actuating the drill bit is also passed into the inlet channel via the air supply line,
a chip evacuation line fluidly coupled with the outlet channel, wherein a Venturi effect between the inlet channel and the outlet channel is configured to pull the smaller chips of FOD away from the drill bit in the second region of the holder center channel and through the chip evacuation line, and
a chip collection hopper fluidly coupled with the chip evacuation line and configured for collecting the smaller chips of FOD therein.

12. The pneumatic drill system of claim 11, further comprising an air manifold with an inlet fluidly couplable to the pneumatic pressure source, a first outlet fluidly coupled with the drill for actuating the drill bit, and a second outlet fluidly coupled with the air supply line.

13. The pneumatic drill system of claim 12, wherein the air manifold is fixedly or removably attached to the chip collection hopper, such that the hopper is attached to the body of the drill via the air manifold.

14. The pneumatic drill system of claim 11, wherein the drill guide bushing holder comprises interior screw threads within at least one of the inlet channel, the outlet channel, and the first region of the holder center channel, wherein at least one of the following comprises exterior screw threads configured for attachment to the interior screw threads of the drill guide bushing holder: the chip breaker bushing, the air supply line, and the chip evacuation line.

15. The pneumatic drill system of claim 11, wherein the chip collection hopper has one or more walls having a plurality of ventilation openings or perforations formed therethrough.

16. The pneumatic drill system of claim 11, wherein the end protrusion is an extended portion of the cylindrical wall circumferentially traversing only a portion of the first circumference between two opposing side edges.

17. A foreign object debris (FOD) collection drill attachment comprising: a drill guide bushing holder comprising:
an inlet channel having a first cross-sectional area,
an outlet channel, having a second cross-sectional area, wherein the first cross-sectional area is smaller than the second cross-sectional area, and
a holder center channel having a first opening, a second opening, a first region, and a second region, wherein the first region extends from the first opening to the second region and the second region extends from the first region to the second opening, wherein the inlet channel and the outlet channel each open into the second region of the holder center channel;
a chip breaker bushing positioned within the holder center channel of the drill guide bushing holder, the chip breaker bushing comprising a cylindrical wall having a first circumference about a center axis of the chip breaker bushing, wherein the cylindrical wall forms a bushing center channel extending along a length of the center axis of the chip breaker bushing, wherein the bushing center channel has sufficient cross-sectional area such that a drill bit of a drill fits therethrough and is rotatable therein;
an air supply line having a first end fluidly coupled with the inlet channel and a second end fluidly couplable to a pneumatic pressure source for operation of the drill, such that pneumatic pressure for actuating the drill bit is also passed into the inlet channel via the air supply line;
a chip evacuation line fluidly coupled with the outlet channel, wherein a Venturi effect between the inlet channel and the outlet channel is configured to pull FOD away from the drill bit in the second region of the holder center channel and through the chip evacuation line;
a chip collection hopper fluidly coupled with the chip evacuation line and configured for collecting the FOD therein; and an air manifold with an inlet fluidly couplable to the pneumatic pressure source, a first outlet configured to be fluidly coupled with the drill for actuating the drill bit, and a second outlet fluidly coupled with the air supply line.

18. The FOD collection drill attachment of claim 17, wherein the air manifold is fixedly or removably attached to the chip collection hopper, such that the hopper is attachable to a body of the drill via the air manifold.

19. The FOD collection drill attachment of claim 18, wherein the cylindrical wall comprises an end protrusion positioned within the second region of the holder center channel such that FOD from a workpiece being drilled by the drill bit is broken into smaller chips by striking the end protrusion while the drill bit rotates within the bushing center channel, wherein the end protrusion is an extended portion of the cylindrical wall circumferentially traversing only a portion of the first circumference between two opposing side edges.

* * * * *